(12) United States Patent
Harris

(10) Patent No.: US 11,609,900 B2
(45) Date of Patent: Mar. 21, 2023

(54) MASSIVELY PARALLEL COMPUTING SYSTEM FOR PROCESSING OF VALUES IN A DISTRIBUTED LEDGER BLOCKCHAIN SYSTEM

(71) Applicant: Scott C Harris, San Diego, CA (US)

(72) Inventor: Scott C Harris, San Diego, CA (US)

(*) Notice: Subject to any disclaimer, the term of this patent is extended or adjusted under 35 U.S.C. 154(b) by 328 days.

(21) Appl. No.: 16/948,560

(22) Filed: Sep. 23, 2020

(65) Prior Publication Data

US 2021/0089516 A1 Mar. 25, 2021

Related U.S. Application Data

(60) Provisional application No. 62/905,621, filed on Sep. 25, 2019.

(51) Int. Cl.
*G06F 16/23* (2019.01)
*G06F 1/14* (2006.01)
*G06F 21/60* (2013.01)
*G06F 16/27* (2019.01)

(52) U.S. Cl.
CPC ............ *G06F 16/2379* (2019.01); *G06F 1/14* (2013.01); *G06F 16/27* (2019.01); *G06F 21/602* (2013.01)

(58) Field of Classification Search
CPC ................ G06F 16/2379; G06F 16/27; G06F 16/24569; G06F 1/14; G06F 21/602; G06F 21/64; G06F 2221/2151
See application file for complete search history.

(56) References Cited

U.S. PATENT DOCUMENTS

| | | | | |
|---|---|---|---|---|
| 10,841,372 | B1* | 11/2020 | Ram | H04L 65/80 |
| 11,164,115 | B1* | 11/2021 | Todd | H04L 9/3239 |
| 2019/0129888 | A1* | 5/2019 | Bowman | G06F 12/0292 |
| 2020/0272619 | A1* | 8/2020 | Alferov | H04L 9/0643 |
| 2020/0304326 | A1* | 9/2020 | Xie | G06F 21/554 |
| 2020/0334669 | A1* | 10/2020 | Makowski | G06Q 20/3678 |
| 2021/0158450 | A1* | 5/2021 | Davis | G06Q 30/0207 |

* cited by examiner

*Primary Examiner* — Philip J Chea
*Assistant Examiner* — Sangseok Park

(57) ABSTRACT

A computer that operates with a distributed ledger system, and stores a copy of a distributed ledger file that is stored by multiple different client computers. The distributed ledger file having plural values therein, and the distributed ledger file also having encryption values that verify the values in the distributed ledger file. The computer processes the values to verify at least some of the values in the distributed ledger file using the encryption values in a way that ascertains a cryptographic accuracy of the values, and to create a report indicating values that have been verified using the encryption values. The computer can use its GPU to process these values in parallel. The computer can also set new sequence numbers using a distributed system, for new values to be added to the distributed ledger.

13 Claims, 1 Drawing Sheet

MASSIVELY PARALLEL COMPUTING SYSTEM FOR PROCESSING OF VALUES IN A DISTRIBUTED LEDGER BLOCKCHAIN SYSTEM

This application claims priority from Provisional application No. 62/905,621, filed Sep. 25, 2019, the entire contents of which are herewith incorporated by reference.

BACKGROUND

Cryptocurrency, and other block chain type systems rely on encryption to maintain the security of the system. Even with the distributed ledger that is used by such blockchain systems, people are attempting to hack the cryptography of the the system.

In addition, cryptocurrency systems often experience a bottleneck, caused by the central computer, e.g., the one that assigns "sequence numbers" to the transactions, being unable to keep up with all of the tasks it needs to carry out.

SUMMARY

The inventor recognizes that a distributed ledger system can also be used with a distributed encryption/processing system, and that this distributed processing system can use massively parallel processing techniques by processing information in the GPU of their computer.

Embodiments describe a system where not only the ledger, but also the encryption is distributed, in the sense that multiple parties store copies of the ledger (a distributed ledger) and multiple parties carry out aspects of the encryption/decryption, forming distributed encryption.

Embodiments describe a distributed ledger system, such as a blockchain system, in which negotiation is automatically carried out to maintain the proper sequence number to the different communications.

BRIEF DESCRIPTION OF THE DRAWINGS the drawings show aspects of the invention as described herein, and specifically:

DETAILED DESCRIPTION

An embodiment starts off with the basic question, in a fully distributed ledger system, where security is supposedly obtained at least partly by multiple parties having copies of the ledger, who is responsible for looking for attempted hacking?

There are many advantages of such a distributed ledger system. In a true distributed ledger system, many different people have copies of the same ledger, and consequently there is security provided by the fact that many different copies are being saved by many different people.

The inventor recognizes, however, that a true distributed system can have much greater throughput than any kind of system where there is actually an arbiter.

Embodiments describe a system where not only the distributed ledger, but also encryption tracking, is distributed.

Embodiment describe forming a system where aspects of the creation of transactions are distributed.

An embodiment described herein can be used with any distributed ledger system. One particularly preferred embodiment describes using the embodiments described herein with a cryptocurrency such as bitcoin. Different features are used herein to maintain the encryption as described with reference to further embodiments also described herein.

The operation occurs between computers, for example, a first computer 100 connected to a network of other computers shown generally as 110. The network could have hundreds, thousands or millions of the computers on the network.

Each time that the distributed ledger is accessed by any user, such as on computer 100, they carry out a checksum and/or hash among certain parts in the ledger, as described herein. This has the effect of distributing the encryption checking of items in the ledger, in addition to distributing the ledger.

Figure 1:
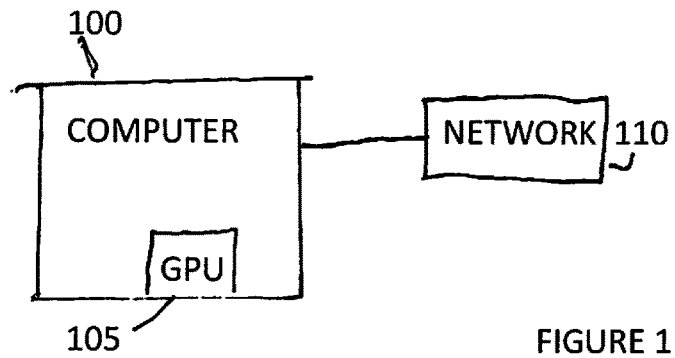
FIG. 1 shows a computer system.
Figure 2:
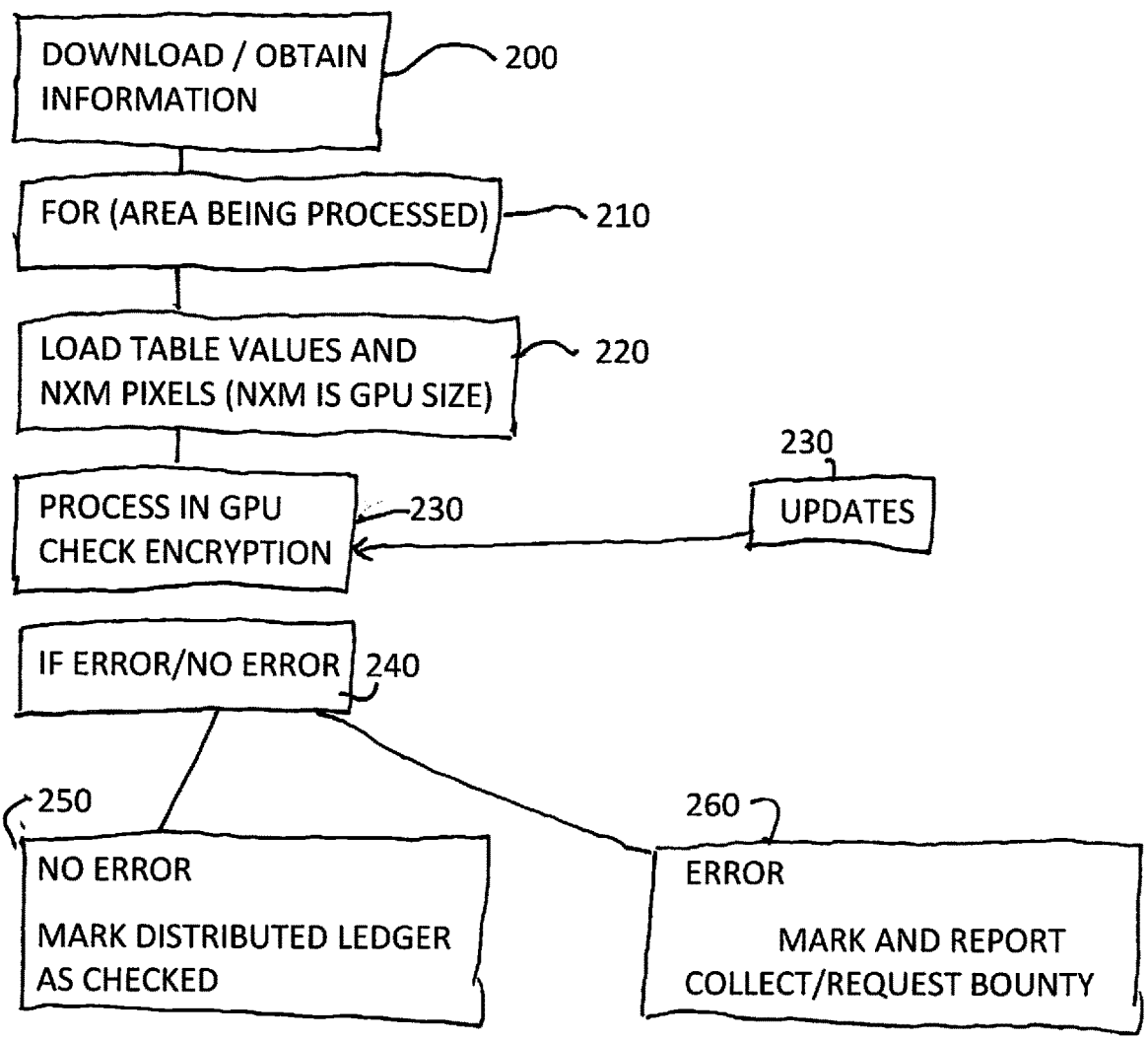
FIG. 2 shows a flowchart of operation of the computer system.

In an embodiment, the computer 100 operates according to the flowchart of FIG. 2. At 200, the computer 100 may download or otherwise obtain information from the distributed ledger. This can be obtained from any other computer, or from a central repository.

At 210, an "area" around the area being processed is defined. This area defines a group of numerical entries in the distributed ledger, and while we refer to it as an area, it is actually a group of numbers. This may be, for example 10,000 transactions around the area which is being processed, which will normally be the end, or most recent, area of the ledger. That is, normally someone is looking for the transactions toward the most recent end of the ledger; however, it is possible for users to look at any group of numbers anywhere in the ledger.

When a user reviews values in the ledger, the table values for an "area" are loaded into arrays of n by m pixels at 220, where n×m is the processing size of the GPU 105 inside the computer. This is loaded to the GPU along with instructions to process these values in parallel and check some aspect of the encryption on each of these values. This can do things like for example, check checksums, hashes, ascertain veracity of encryption, or carry out any other value that ascertains the cryptographic accuracy of the values.

240 determines if there is any error in the parts of the ledger which have been checked.

If there is no error, at 250, the results may be uploaded to the distributed ledger indicating that the area has been checked. This may be considered optional, since theoretically all areas of the distributed ledger are always tracked. However, if there is an error, then a value indicative of the error and the area where the error occurred is marked and reported. The report becomes part of the distributed ledger, being uploaded to everyone who keeps a copy of the distributed ledger. Others check that distributed ledger also, and at some point form a consensus that there is in fact an error either in the distributed ledger itself, or in the version of the distributed ledger which the computer 100 has obtained.

In an embodiment, computers that find errors can request a "bounty".

In the original days of cryptocurrency, people were paid for finding a usable token, that is a token which could be used as part of the cryptocurrency. In an embodiment, users pay a certain amount of money to a distributed repository each time they want to buy or use a coin or token. That payment is made as a service fee. The service fee may be a small amount, for example 0.2 to 2% of each transaction. That money is a percentage of overhead, and a percentage of bounty for finding someone who is attempting to hack the encryption. Consequently, if a user discovers someone hacking the encryption, and reports it at 260, the reporting party can receive a bounty from the central repository paid out of the bounty reserved for such payments.

In another embodiment, users will receive a certain percentage of the overhead for mirroring. In this embodiment, users may receive z dollars for mirroring and checking any particular part, and may receive some other amount for finding a hack or error in the decryption. Of course the fee for mirroring would likely be very small, but still would be something to offset the costs to a user of storing the whole distributed ledger.

Many have postulated that it is impossible to hack bitcoin and other distributed ledger systems. However, current events have shown that to be incorrect. Sufficiently determined hackers, especially those in rogue states, have made progress toward hacking distributed ledgers. Therefore, the program that is used at 230 receives periodic updates at 231 indicating different kinds of hacks that the system might be looking for.

Another embodiment carries out the same functions without using the GPU, just by using a very strong processor.

Certain distributed ledgers have used a sequence number, assigned by a central arbiter. However, since sequence numbers need to be assigned in real time, this can lead to process bottlenecks when there is a specific server handing out the sequence numbers.

An embodiment describes a way of carrying out a distributed sequence number determination to determine sequence numbers using a distributed system.

The transaction with the sequence number may be in the form:

<assigned sequence number></msg—I am assigning a sequence/><credentials of assigner, sign with private key><message payload><crypto sigs/hash/link/block> where the assigned sequence number is the number being postulated by the system, along with a message indicating that this is an attempt at assigning a sequence number, followed by the credentials of the signer signed with their private key, followed by the message payload, the actual important part of the message, followed by the cryptographic checksums such as hashes, links blocks and private keys. This message goes out to the distributed ledgers, and will be accepted or rejected based on certain criteria.

In the embodiments, the distributed-assigned sequence number can be assigned in a number of different ways.

In a first embodiment, the system gets the distributed ledger, finds the last assigned number, and then chooses the next number. Almost certainly, this number will be chosen by many different people. Consequently all the different parties with the same number get arbitrated, to determine who gets that number. If the system is going to use a central repository to determine which is the authorized number, each client takes actions to try to get the central repository to adopt their number. Otherwise, each client adopting or downloading information from the ledger will get a number of different messages which are not yet fully adopted, including one with your number, and perhaps others with your number. The clients can select which of the numbers they believe to be the winner, for example the first one they receive, or the client that has the most trustworthy rating. In this latter case, clients may receive ratings depending on whether they provide trustworthy data, for example, such as how many times a client has repeated an improperly encrypted sequence. Conversely, clients that identify bad encryption, as described above, may have their ratings improved by identifying the bad encryption. Clients can also have their ratings increased by carrying out more mirroring of the distributed ledger or carrying out more encryption on the distributed ledger.

The clients can also choose values beyond the next sequence number, for example choosing a value in the sequence which is 50 ahead of the next sequence number. For lower rated computers, the computer may so that it will be the first one to use that sequence number making it more likely that the value in the sequence with that sequence number get adopted.

At some point, when a consensus is reached (by some percentage of clients identifying the message as valid, e.g., 80% of the clients identifying the message as valid), that new message will be the adopted message, added to the distributed ledger as an adopted message, rather than a non adopted message, and sent to all mirroring clients.

In order to operate in this system, it is desirable for each client to try to send the distributed ledger in a way that it will be received by as many clients as possible, and to try and get a better rating, by evaluating more blocks, storing more information, checking more encryption, and the like. That is, a client that stores more data and checks more data will be a more highly rated client, and more likely to receive the number that they ask for.

A second way of assigning the number is to use a timecode. Again this may use a central repository as the keeper of absolute time, or this can be synced with an NNTP server or the like that is maintaining good network time. In this embodiment, a timecode which includes 7 to 10 digits of precision is used as the sequence number. For example, a timecode that has 10 digits of accuracy can be used as the sequence number, making it less likely that two clients will select the same time code. If two clients select the same time code, then either both of them can be bounced requesting additional or new numbers; or alternatively the time the timecode from the more highly rated client is accepted and the other client is bounced.

Although only a few embodiments have been disclosed in detail above, other embodiments are possible and the inventors intend these to be encompassed within this specification. The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising:
   a computer that receives a copy of a distributed ledger file that is stored by multiple different client computers,
   the distributed ledger file having plural values therein, and the distributed ledger file also having encryption values that verify the values in the distributed ledger file;
   the computer operating to verify at least some of the values in the distributed ledger file using the encryption values in a way that ascertains a cryptographic accuracy of the values, and to create a report indicating values that have been verified using the encryption values, wherein the computer determines if there is an error in any of the values using the encryption values, and the report represents a value indicative of the error and an area in the distributed ledger file where the error occurred, and where the computer carries out operations to make the report become part of the distributed ledger to be uploaded to everyone who keeps a copy of the distributed ledger.

2. The system as in claim 1, wherein the computer has a graphics processing unit, and where plural values of the distributed ledger file are respectively loaded into arrays of N×M values in parallel into the graphics processing unit, along with instructions to process these values in parallel, each and check some aspect of encryption of at least a plurality of the N×M values.

3. The system as in claim 1, wherein the checking the encryption carries out at least one of check a checksum, check a hash value, or ascertain a veracity of encryption.

4. The system as in claim 1, where the computer also adds an additional value to the distributed ledger file, the additional value having a sequence number which is assigned by the computer.

5. A system comprising:
a computer that receives a copy of a distributed ledger file that is stored by multiple different client computers,
the distributed ledger file having plural values therein, and the distributed ledger file also having encryption values that verify the values in the distributed ledger file;
the computer operating to verify at least some of the values in the distributed ledger file using the encryption values in a way that ascertains a cryptographic accuracy of the values, and to create a report indicating values that have been verified using the encryption values,
where the computer also adds an additional value to the distributed ledger file, the additional value having a sequence number which is assigned by the computer,
wherein the additional value is a sequence value that is beyond a current sequence value, and the computer and other computers distribute a task of determining which of a plurality of overlapping sequence values is accepted as an adopted sequence value.

6. The system as in claim 5, where each of the computers have a rating depending on an amount of processing done by the each computer on values in the distributed ledger, and in a case where multiple different computers have overlapping sequence values, then establishing a sequence value from a computer with a highest rating as the adopted sequence value.

7. The system as in claim 4, wherein the sequence number is a timestamp representing a real time from a real time clock.

8. A system comprising:
a computer that receives a copy of a distributed ledger file that is stored by the computer and by multiple other client computers,
the distributed ledger file having plural values therein, and sequence values for the plural values, each sequence value representing a specific transaction;
the computer and the multiple other client computers carrying out a distributed sequence number determination to determine new sequence values for new values being added to the distributed ledger file, wherein the new sequence value is a value that is beyond a current sequence value, and the computer and the other computers distribute a task of determining which of a plurality of overlapping sequence values is accepted as an adopted sequence value.

9. The system as in claim 8, where each of the computers have a rating depending on an amount of processing done by the each computer on values in the distributed ledger, and in a case where multiple different computers have overlapping sequence values, then establishing a sequence value from a computer with a highest rating sequence value as the adopted sequence value.

10. The system as in claim 8, wherein the sequence number is a timestamp representing a real time from a real time clock.

11. The system as in claim 8, wherein
the distributed ledger file also having encryption values that verify the values in the distributed ledger file;
the computer operating to verify at least some of the values in the distributed ledger file using the encryption values in a way that ascertains a cryptographic accuracy of the values, and to create a report indicating values that have been verified using the encryption values.

12. The system as in claim 11, wherein the computer has a graphics processing unit, and where plural values of the distributed ledger file are respectively loaded into arrays of N×M values in parallel into the graphics processing unit, along with instructions to process these values in parallel, each and check some aspect of encryption of at least a plurality of the N×M values.

13. A system comprising:
a computer that receives a copy of a distributed ledger file that is stored by the computer and by multiple other client computers,
the distributed ledger file having plural values therein, and sequence values for the plural values, each sequence value representing a specific transaction;
the computer and the multiple other client computers carrying out a distributed sequence number determination to determine new sequence values for new values being added to the distributed ledger file, wherein
the distributed ledger file also having encryption values that verify the values in the distributed ledger file;
the computer operating to verify at least some of the values in the distributed ledger file using the encryption values in a way that ascertains a cryptographic accuracy of the values, and to create a report indicating values that have been verified using the encryption values, and wherein the computer determines if there is an error in any of the values using the encryption values, and the report represents a value indicative of the error and an area in the distributed ledger file where the error occurred, and where the computer carries out operations to make the report become part of the distributed ledger to be uploaded to everyone who keeps a copy of the distributed ledger.

* * * * *